(12) United States Patent
Gerbaud

(10) Patent No.: US 8,506,074 B2
(45) Date of Patent: Aug. 13, 2013

(54) OPHTHALMIC LENS AND SPECTACLES COMPRISING AT LEAST SUCH ONE LENS

(75) Inventor: Guy Gerbaud, Eguilles (FR)

(73) Assignee: Ice Foster Ltd. (VG)

( * ) Notice: Subject to any disclaimer, the term of this patent is extended or adjusted under 35 U.S.C. 154(b) by 27 days.

(21) Appl. No.: 12/993,075

(22) PCT Filed: May 19, 2008

(86) PCT No.: PCT/FR2008/000689
§ 371 (c)(1),
(2), (4) Date: Apr. 14, 2011

(87) PCT Pub. No.: WO2009/141509
PCT Pub. Date: Nov. 26, 2009

(65) Prior Publication Data
US 2011/0181834 A1 Jul. 28, 2011

(51) Int. Cl.
*G02C 7/00* (2006.01)
(52) U.S. Cl.
USPC .................. 351/159.42; 351/159.01
(58) Field of Classification Search
USPC ............ 351/159.01, 159.41–159.43, 159.47, 351/159.71, 159.73–159.73
See application file for complete search history.

(56) References Cited

U.S. PATENT DOCUMENTS 2,878,721 A * 3/1959 Kanolt ..................... 351/159.42
5,327,181 A 7/1994 Waido

FOREIGN PATENT DOCUMENTS

| EP | 0702257 | 3/1996 |
| EP | 1688781 | 8/2006 |
| FR | 2683642 | 5/1993 |
| FR | 2769997 | 4/1999 |
| FR | 2844365 | 3/2004 |
| WO | 2006000682 | 1/2006 |
| WO | 2006003275 | 1/2006 |

OTHER PUBLICATIONS

International Search Report; PCT/FR2008/000689; Dec. 15, 2008.

\* cited by examiner

*Primary Examiner* — James Greece
(74) *Attorney, Agent, or Firm* — Cantor Colburn LLP

(57) ABSTRACT

Ophthalmic lens including at least one spherical face with an optical center and a geometrical center, and having in succession a top vision region, an intermediate vision region and a bottom vision region, with a principal meridian of progression traversing the three vision regions of the aspherical face, the lens being noteworthy in that the top vision region is adapted for mid-distance vision, the bottom vision region is adapted for near-distance vision, and the intermediate vision region is adapted for intermediate distance vision, and in that the optical center of the aspherical face is in the intermediate vision region, the optical center coinciding with the geometrical center of aspherical face. This lens is particularly suitable for people with emmetropic longsightedness.

10 Claims, 3 Drawing Sheets

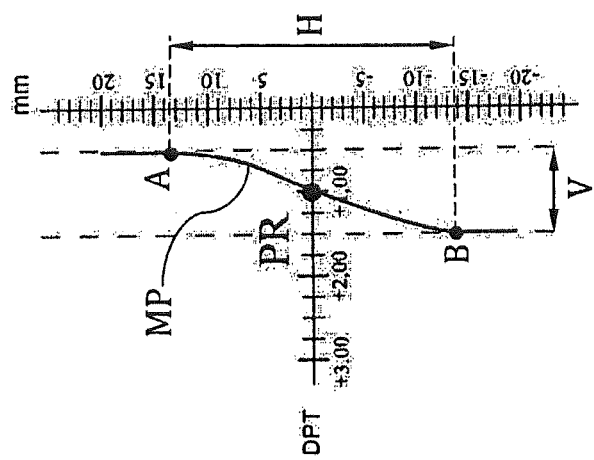
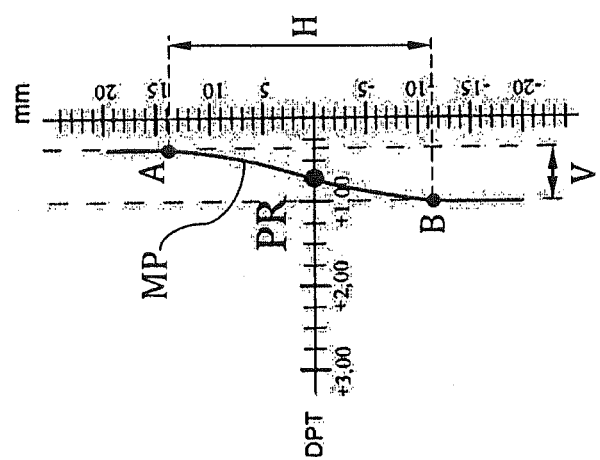

OPHTHALMIC LENS AND SPECTACLES COMPRISING AT LEAST SUCH ONE LENS

TECHNICAL FIELD

The present invention relates to ophthalmic lens and to a pair of spectacles comprising at least such one lens.

More particularly, it relates to an ophthalmic lens intended for compensating presbyopia, corresponding to a reduction in the accommodation of the crystalline lens due to natural ageing of the eye.

BACKGROUND

Presbyope individuals are mainly divided into two categories:
- ametropic presbyopes, i.e. individuals having before their presbyopia, a visual defect, so-called ametropia, such as for example myopia, hypermetropia or astigmatism; and
- emmetropic presbyopes, i.e. individuals not having before their presbyopia, any visual defect.

The present invention still more particularly relates to a progressive ophthalmic lens intended for emmetropic presbyopes.

For compensating presbyopia, it is known how to use a unifocal convex lens or a progressive ophthalmic lens.

Unifocal convex lens is conventionally adapted to vision at a close distance, i.e. at a reading distance comprised between 20 and 40 cm, preferentially of the order of 33 cm. The dioptric values compensating presbyopia range from +0.75 to +3.50 diopters per half or quarter diopter, in order to take into account rapid development of presbyopia. Thus, the emmetropic presbyope is led to regularly changing his/her lenses depending on the development of this ocular disorder and, if a lens with a power of +0.75 or +1.00 diopter is sufficient for the emerging presbyope or individual at the beginning of his/her presbyopia, he/she will rapidly be forced to use increasingly convex lenses up to a value from +3.00 to 3.50 diopters.

If a unifocal lens provides clear vision for reading, it however considerably reduces the vision distance by a loss of depth of field and this all the more so since the convex value of the lens is high. Now because of the increasingly frequent use of computer instruments, emmetropic presbyopes also need a lens which provide them with clear vision at a so-called intermediate distance corresponding to a working distance from a computer screen; this intermediate distance, located beyond the close distance or aforementioned reading distance, is comprised between 40 and 90 cm, preferentially of the order of 50 to 80 cm.

Working with a computer often requires seeing at the same time an object at a close distance, such as for example a reading document and a keyboard located at a close distance, and an object at an intermediate distance, in this case the computer screen. In order to meet this dual need of vision at a close distance and at an intermediate distance, the emmetropic presbyope would have no other choice but to have two pairs of spectacles with a unifocal lens, one dedicated to close distance vision the other one dedicated to intermediate distance vision.

The multifocal progressive ophthalmic lens, notably known from document FR 2 683 642, is conventionally used for compensating presbyopia while allowing the wearer of a pair of spectacles to observe objects over a large distance range without having to remove his/her pair of spectacles. Such a lens comprises an aspherical face having:

- a top vision region suitable for far distance vision, i.e. for vision at infinity notably useful for driving a motor vehicle, said region being located in the high portion of the lens;
- a bottom region for close distance vision, suitable for reading, said region being located in the low portion of the lens; and
- an intermediate region connecting the top vision region to the bottom vision region, a so-called intermediate vision region.

Usually, the aspherical face corresponds to the front face of the lens, which is the face opposite to the wearer of the pair of spectacles, while the rear face of the lens, which is the face directed towards the wearer of the pair of spectacles, is of the spherical type. With this spherical face, it is possible to adapt the lens to the ametropia of the wearer, so that the multifocal progressive ophthalmic lens is generally defined by its aspherical surface. Such progressive lenses thus have the primary purpose of compensating ametropia of the wearer in the high portion corresponding to the top far vision region, but also presbyopia in the low portion, corresponding to the bottom close-distance vision region. The intermediate vision region of these progressive lenses is generally very narrow between the aforementioned bottom and top vision regions. In the present state of the art, it is noticed that progressive lenses impose to a wearer who is looking at a computer screen to raise his/her head and to aim in the said narrow intermediate vision region. This non-ergonomic position is source of discomfort for presbyopes.

The mounting in a spectacle frame of a pair of progressive multifocal ophthalmic lenses requires great accuracy and can only be achieved by one skilled in the art. The mounting can only be carried out after a series of conducted measurements which take into account the position of the frame on the face of the wearer. The accuracy in the positioning of the reference point (also called lens design reference point) in the frame is essential for such lenses.

The state of the art may also be illustrated by the teaching of the patent application FR 2 769 997. In this application, for compensating presbyopia, the use of a multifocal ophthalmic lens having an aspherical face having a substantially umbilical and vertical principal meridian of progression is provided and the reference point of which for close vision is located at about 10 mm under the geometrical centre of the lens. This particular lens thus has an optical centre for close vision under the geometrical centre with a spherical decrease from this point up to the top of the lens. This lens of the multifocal type, which also allows compensation of ametropia, cannot be simply mounted in a frame since it also requires certain measurements associated with the physiognomy of the wearer. The mounting can only be achieved by one skilled in the art.

From patent application FR 2 844 365, a spectacle lens is also known, having an aspherical face with a non-umbilical principal meridian of progression and including:
- a central portion adapted for intermediate distance vision, notably for working with a computer, the average transmission power in this central portion being substantially constant;
- a top portion located on an upper side of the central portion, the average transmission power decreasing in the this top portion; and
- a bottom portion located on a lower side of the central portion, the average transmission power increasing in this bottom portion.

This lens has the drawback of respectively providing two bottom and top portions which are very narrow. Thus, the narrow top region is detrimental to peripheral visual perception in proximity vision by a restricted lateral field.

BRIEF SUMMARY

The invention is intended notably to solve all or part of the aforementioned drawbacks, and proposes for this purpose an ophthalmic lens including at least one aspherical face having an optical centre, a geometrical centre and successively comprising a top vision region, an intermediate vision region and a bottom vision region, as well as a principal meridian of progression crossing said three vision regions of the aspherical face, said lens being noteworthy in that the top vision region is adapted for mid-distance vision, the bottom vision region is adapted for close-distance vision and the intermediate vision region is adapted for intermediate distance vision, and in that said aspherical face has its optical centre in said intermediate vision region, said optical centre coinciding with the geometrical centre of the aspherical face.

In the sense of the present application, the different vision regions are defined as follows:
- the close-distance vision region corresponds to a vision region at a reading distance comprised between 20 and 40 cm, preferentially of the order of 33 cm;
- the intermediate distance vision region corresponds to a vision region at a working distance from a computer screen comprised between 40 and 90 cm, preferably of the order of 50 to 80 cm, beyond the aforementioned reading distance and below the mid-distance;
- the mid-distance vision region corresponds to a vision region at a distance of the order of 1 meter, preferentially between 80 cm and 5 m, still preferentially between 1 m and 3 m, beyond the aforementioned intermediate distance and below infinity which is conventionally associated with far distance vision.

Thus, the top vision region is adapted for mid-distance vision and not for vision at infinity or far distance vision, and the bottom vision region is adapted for close-distance vision, so that the difference in power between both regions is relatively small as compared with that of conventional progressive multifocal lenses. The intermediate vision region therefore has a change in average power or sphere which is relatively small or slight, thereby providing vision comfort.

The invention thus meets the visual problem of the emmetropic presbyope by proposing a lens mainly dedicated to his/her visual need at an intermediate distance, like the distance from a computer screen, while preserving close-distance vision and also providing a great depth of field with a wide lateral field for a working environment.

The optimum comfort of the lens according to the invention is located at the optical centre, coinciding with the geometrical centre, for preferential intermediate distance vision.

This lens intended for emmetropic presbyope individuals, of course, does not allow compensation of ametropia, but is perfectly adapted for close-distance and intermediate distance vision.

In a particular embodiment of the invention, the principal meridian of progression is of the substantially umbilical type, i.e. on which astigmatism is minimum or even zero, and vertical type.

Thus, the lens is particularly simple to make and may be equally used on the right and on the left in a spectacle frame, and mainly requires during its mounting into the frame that vertical alignment of the principal meridian of progression be ensured.

Advantageously, the aspherical face is substantially symmetrical relatively to said principal meridian of progression.

The invention thus meets the dual need of emmetropic presbyopes for a lens adapted for computer tasks. The lens may be simply mounted in a frame like a unifocal convex spherical lens. In this way, this lens may for example be pre-mounted in a spectacle frame.

In an embodiment, the top vision region corresponds to the region of the aspherical face located above the optical centre and having an sphere power (also called average sphere) substantially constant on the principal meridian of progression, and the value of which is comprised between 0.2 and 2.0 diopters and preferentially between 0.3 and 1.7 diopters.

This top vision region is thus particularly adapted for mid-distance vision.

In a particular embodiment, the bottom vision region corresponds to a region of the aspherical face located below the optical centre and having an sphere power substantially constant on the principal meridian of progression, and the value of which is comprised between 0.8 and 3.5 diopters, preferentially between 1.0 and 3.0 diopters.

This bottom vision region is thus particularly adapted for close-distance vision.

In an advantageous embodiment, the intermediate vision region corresponds to a region of the aspherical face having a change in sphere power along the principal meridian of progression between the top and bottom vision regions.

This sphere power variation is sufficiently gentle or small in order to allow great vision comfort at an intermediate distance for the wearer; said intermediate vision region being framed by the top region for mid-distance vision and the bottom region for close-distance vision.

This sphere power variation is advantageously comprised between 0.6 and 2.2 diopters, preferentially between 0.75 and 2.0 diopters.

According to a feature, the value of the sphere power at the optical centre of the lens, on the principal meridian of progression is comprised between 0.5 and 2.5 diopters, preferentially between 0.7 and 2.25 diopters.

According to another feature, the height of progression in the intermediate vision region, along the principal meridian of progression is less than or equal to 35 mm, preferentially less than or equal to 33 mm.

The height of progression is sufficiently high so that the width of the intermediate vision region is not narrow and thereby provides great vision comfort at an intermediate distance for the wearer.

Advantageously, the umbilical meridian width delimited by the curves of iso-cylinder power of less than or equal to 0.2 diopter, preferentially 0.17 diopter, at the optical centre of the lens is at least sufficient for covering an angle of rotation of the eye comprised between about 6° and 8° when the lens is at a distance of about 14 mm from the eye.

This angle of rotation of the eye of 6° to 8° corresponds to the angle beyond which it is commonly recognized that the head of an individual rotates in order to retain greater visual comfort; with the invention is thereby possible to provide great lateral vision comfort at an intermediate distance for the wearer.

In a particular embodiment, the umbilical meridian width delimited by the curves of iso-cylinder power of less than or equal to 0.2 diopter, preferentially 0.17 diopter, at the optical centre of the lens is at least 3 mm.

With such a width, the lens gives the possibility of covering the angle of rotation of the eye comprised between 6° and 8° in order to provide great lateral vision comfort at an intermediate distance for the wearer.

According to an advantageous feature of the invention, the iso-cylinder curves, preferentially the curves of iso-cylinder power of less than or equal to 0.25 diopter, are substantially parallel to the principal meridian of progression in the intermediate vision region.

Thus, the lens has in its central portion a wide and comfortable progression region for intermediate distance vision.

The invention also relates to spectacles comprising at least one lens as described above.

According to an advantageous feature, the spectacles comprise two symmetrical lenses relatively to the middle plane of symmetry of said spectacles.

BRIEF DESCRIPTION OF THE DRAWINGS

Other features and advantages of the present invention will become apparent upon reading the detailed description hereafter, of an exemplary non-limiting embodiment, made with reference to the appended figures wherein:

FIGS. 1a-1e are graphs illustrating the sphere power variation along the principal meridian of progression of different embodiments of the lens according to the invention, where the axis of abscissas is graduated in diopters for the sphere power values, and where the axis of ordinates is graduated in millimeters for the distance from a central point of the meridian;

DETAILED DESCRIPTION

Figure 1C:
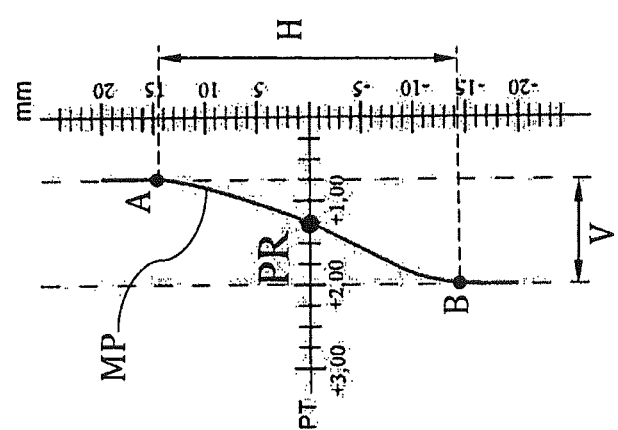
Figure 1D:
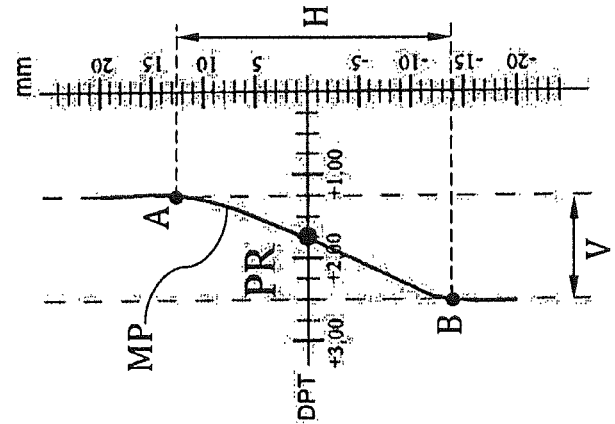
Figure 1E:
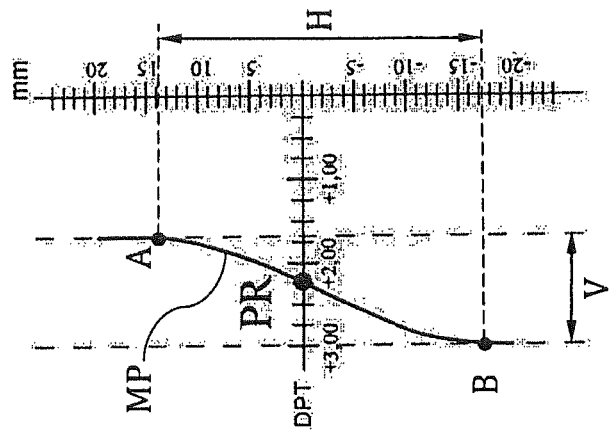

A lens according to the invention comprises at least one aspherical face having a geometrical centre and an optical centre which coincide at the point PR in FIGS. 1a-1e. This point PR corresponds to the reference point of the design of the lens, sometimes called the lens design reference point or centering point of the lens. The optical centre may be defined as follows: a light ray from infinity and crossing the lens at the optical centre does not undergo any angular deviation.

The aspherical face has at each point a sphere power value and a cylinder power value.

This aspherical face has three different vision regions:
 a top vision region, located in the high portion of the lens from an upper edge of said lens, and adapted for mid-distance vision, already defined as a vision at a distance of the order of one meter;
 a bottom vision region, located in the low portion of the lens from a lower edge of said lens, and adapted for close-distance vision, already defined as a vision at a reading distance;
 an intermediate vision region, located between the bottom and top vision regions in the central portion of said lens, and adapted to intermediate distance vision, between a mid-distance vision and a close-distance vision and already defined as a vision suitable for working on a computer screen.

These three vision regions are crossed by a principal meridian of progression MP which passes through the optical centre PR; said optical centre PR being located in the intermediate vision region.

Further, the principal meridian of progression MP is substantially vertical and umbilical. Also, the surface of the aspherical face is substantially symmetrical relatively to its substantially vertical and umbilical principal meridian of progression MP Thus, the aspherical face of the lens is substantially symmetrical and the vertical axis y of the lens is an umbilical principal meridian of progression allowing the use of the same lens equally for the right eye and for the left eye. The lens may thus be mounted in a spectacle frame while maintaining the axis of symmetry y vertical.

The principal meridian of progression MP is continuous, i.e. the intermediate vision region for which the average power or sphere varies continuously along the principal meridian of progression MP, and is continuously connected to said bottom and top vision regions, is provided between the bottom and top vision regions.

The principal meridian of progression MP is substantially symmetrical relatively to the optical centre PR of the lens coinciding with the geometrical centre. In a non-illustrated alternative, the meridian of progression MP is not symmetrical relatively to said optical centre PR so that the lens has asymmetry in its vertical progression.

In the top vision region, located above the optical centre PR, the sphere power is substantially constant on the principal meridian of progression MP and equal to a given value SA comprised between 0.2 and 2.0 diopters, and preferentially between 0.3 and 1.7 diopters.

In the bottom vision region, located below the optical centre PR, the sphere power is substantially constant on the principal meridian of progression MP and equal to a given value SB comprised between 0.8 and 3.5 diopters, and preferentially between 1.0 and 3.0 diopters.

In the intermediated vision region, the sphere power progressively varies on the principal meridian of progression MP between the values SA and SB of sphere power on the principal meridian of progression MP of the top and bottom vision regions respectively. In this intermediate vision region, along the principal meridian of progression MP, the sphere power variation V is comprised between 0.6 and 2.2 diopters, preferentially between 0.75 and 2.0 diopters.

The height of the progression is thus comprised between the two points located on the principal meridian of progression MP, below and above the optical centre PR of the lens, representing for the low point B the maximum value SB of the sphere power and for the high point A the minimum value SA of the sphere power. Thus, the sphere power is substantially constant on the principal meridian of progression MP below the point B of maximum sphere power SB, and the sphere power is substantially constant on the principal meridian of progression MP above the point A of minimum sphere power SA.

The height H of progression in the intermediate vision region, along the principal meridian of progression MP between the points A and B, is less than or equal to 35 mm, preferentially less than or equal to 33 mm. Such a height H is thus adapted in order to allow the eye to perform vertical travel (from top to bottom or bottom to top) before the head follows while maintaining vision via said intermediate vision region, it being frequently recognized that such vertical travel corresponds to an angle of vision of about 26°.

On the upper portion of the principal meridian of progression MP located in the intermediate vision region in proximity to the optical centre PR, the aspherical face has an sphere power allowing good vision at an intermediate distance adapted for clearly viewing a computer screen for example located at about 60-80 cm.

The value SC of the sphere power at the optical centre PR of the lens, on the principal meridian of progression MP, is comprised between 0.5 and 2.5 diopters, preferentially between 0.7 and 2.25 diopters.

On the portion of the principal meridian of progression MP located below the optical centre PR, the aspherical face has an increase in the sphere power allowing good vision at a close distance, like a reading distance of the order of 30 cm, while above the optical centre PR on the umbilical principal meridian of progression MP, the aspherical face has a substantial reduction in the sphere power providing a great depth of field which may range up to about 2-3 m depending on the embodiment.

In the various embodiments illustrated in FIGS. 1a-1e, the aspherical face has different values of sphere power and height of progression, with:

SA the minimum sphere power on the principal meridian of progression MP;
SB the maximum sphere power on the principal meridian of progression MP;
SC the sphere power at the optical centre PR on the principal meridian of progression MP;
V the variation of sphere power between the points A and B along the principal meridian of progression MP;
H the height of progression along the principal meridian of progression MP.

Thus, in the different embodiments illustrated in FIGS. 1a-1e, the aspherical face has the following values:

in FIG. 1a: SA=0.3 diopters, SB=1.0 diopters, SC=0.75 diopters, V=0.7 diopters H=25 mm;
in FIG. 1b: SA=0.5 diopters, SB=1.5 diopters, SC=1.0 diopters, V=1.0 diopters and H=27 mm;
in FIG. 1c: SA=0.75 diopters, SB=2.0 diopters, SC=1.25 diopters, V=1.25 diopters and H=29 mm;
in FIG. 1: SA=1.25 diopters, SB=2.5 diopters, SC=1.75 diopters, V=1.25 diopters and H=26 mm;
in FIG. 1e: SA=1.7 diopters, SB=3.0 diopters, SC=2.25 diopters, V=1.3 diopters and H=31 mm.

Figure 2A:
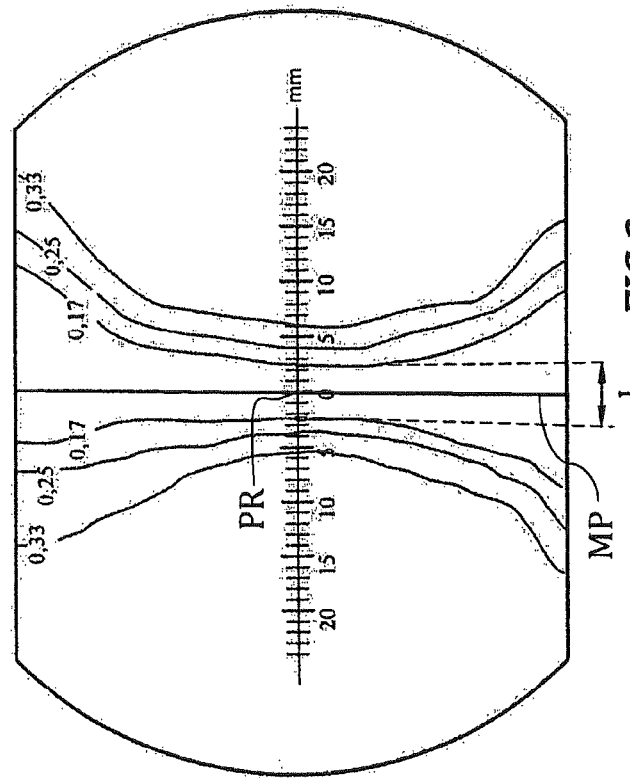
FIG. 2a is a front view of a cylinder map of a lens according to the invention illustrating several iso-cylinder power curves of less than 0.50 diopters.
Figure 2B:
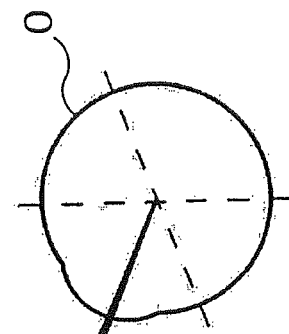
FIG. 2b is a perspective view, of the cylinder map illustrated in FIG. 2a only with the iso-cylinder power curve equal to 0.17 diopters, with an illustration of an eye located at a predetermined distance from the lens and of an angular sector associated with a rotation of the eye in a horizontal plane.
Figure 2B:
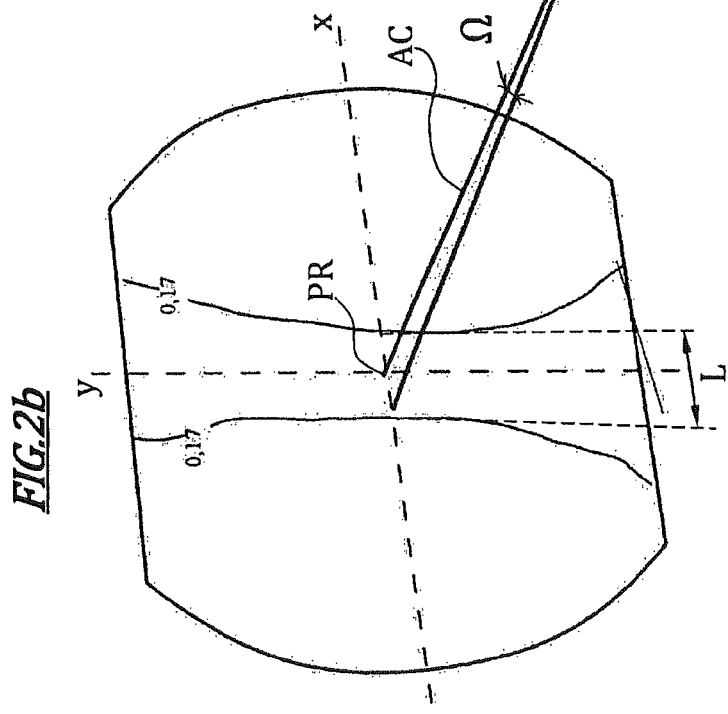

As illustrated in FIGS. 2a and 2b, the umbilical meridian width L delimited by the curves of iso-cylinder power of less than or equal to 0.2 diopters, preferentially less than or equal to 0.17 diopters, at the optical centre of the lens is at least sufficient for covering an angle of rotation of the eye Ω comprised between 6° and 8° relatively to the central vision axis AC passing through the optical centre PR, when the lens is at a distance of about 14 mm from the eye, in order to allow the wearer to rotate his/her eyes without having to rotate his/her head while retaining good vision. FIGS. 2a and 2b of course correspond to an exemplary embodiment of a lens according to the invention, the thereby illustrated iso-cylinder curves being different for each lens and notably for each sphere power variation V along the principal meridian of progression.

Thus, the umbilical meridian width L delimited by the iso-cylinder curves of less than or equal to 0.2 diopters, preferentially less than or equal to 0.17 diopters, at the optical centre PR of the lens is at least 3 mm.

The lens according to the invention is of the convex type, and has at least one aspherical face associated with another face, which may be spherical or aspherical. Thus, different combinations are possible:

an aspherical front face and an aspherical rear face, each aspherical face being as described above and therefore each having a substantially umbilical and vertical principal meridian of progression;
an aspherical front face and an aspherical rear face;
a spherical front face and an aspherical rear face.

Spectacles fitted with lenses according to the invention are not designed for compensating ametropia, but are perfectly adapted to emmetropic presbyopes wishing to work on a computer with great vision comfort both for the computer screen and the keyboard and for documents located at a reading distance, without their having to change spectacles.

Further, the lenses according to the invention may be mounted in a simple way in a frame. The main concern of the fitter is to place the geometrical centres of both lenses of frame on a same horizontal of the frame and symmetrical on either side of the nose (vertical axis) of the frame, at a value corresponding to an average pupil distance (physiological datum), and to make sure that the principal meridian of progression is vertical and properly oriented.

These spectacles may be pre-mounted, notably because of the ease of mounting the lenses, and be sold as such.

Of course, the exemplary embodiment mentioned above does not have any limiting nature and other details and enhancements may be provided to the lens according to the invention, without however departing from the scope of the invention.

The invention claimed is:

1. An ophthalmic lens including at least one aspherical face having an optical centre defined as being a point of the lens such that a light ray from infinity and crossing the lens at this point does not undergo any angular deviation, a geometrical centre and successively comprising a top vision region, an intermediate vision region and a bottom vision region, as well as a principal meridian of progression crossing said three vision regions of the aspherical face, wherein:
the top vision region is adapted for mid-distance vision, said mid-distance being a distance between 80 cm and 5 m, and said top vision region corresponding to a region of the aspherical face located above the optical centre and having a constant sphere power on the principal meridian of progression, and a value of which is comprised between 0.2 and 2.0 diopters;
the bottom vision region is adapted for close distance vision, said close distance being a reading distance between 20 and 40 cm, and said bottom vision corresponding to a region of the aspherical face located below an optical centre and having a constant sphere power on the principal meridian of progression, and a value of which is comprised between 0.8 and 3.5 diopters; and
the intermediate vision region is adapted for intermediate distance vision, said intermediate distance being a distance between 50 and 80 cm, beyond the close distance and below the mid-distance, said intermediate vision region corresponding to a region of the aspherical face having a sphere power variation along the principal meridian of progression between the top and bottom vision regions, said sphere power variation being comprised between 0.6 and 2.2 diopters; and
wherein said aspherical face has an optical centre in said intermediate vision region, said optical centre coinciding with the geometrical centre of the aspherical face.

2. The lens according to claim 1, wherein the aspherical face has the principal meridian of progression of a substantially umbilical and vertical type.

3. The lens according to claim 2, wherein said aspherical face is substantially symmetrical relatively to said principal meridian progression.

4. The lens according to claim 1, wherein a value of the sphere power at the optical center of the lens, on the principal meridian of progression is comprised between 0.5 and 2.5 diopters.

5. The lens according to claim 1, wherein a height of progression in the intermediate vision region, along the principal meridian of progression is less than or equal to 35 mm.

6. The lens according to claim 2, wherein the umbilical meridian width delimited by curves of iso-cylinder power of less than or equal to 0.2 diopters at the optical centre of the lens is at least sufficient for covering an angle of rotation of the eye comprised between about 6° and 8° when the lens is at a distance of about 14 mm from the eye.

7. The lens according to claim 6, wherein the umbilical meridian width delimited by the curves of iso-cylinder power of less than or equal to 0.2 diopters at the optical centre of the lens, is at least 3 mm.

8. The lens according to claim 7, wherein the iso-cylinder curves are substantially parallel to the principal meridian of progression in the intermediate vision region.

9. The lens according to claim 1, wherein the geometrical centre and the optical centre coincide at the lens design reference point.

10. Spectacles comprising at least one lens according to claim 1.

* * * * *